United States Patent

Richardson

[11] Patent Number: 5,881,490
[45] Date of Patent: Mar. 16, 1999

[54] FISHING RIG

[76] Inventor: Charles Richardson, P.O. Box 444, Stone Harbor, N.J. 08247

[21] Appl. No.: 989,244

[22] Filed: Dec. 12, 1997

[51] Int. Cl.[6] .................................................. A01K 83/06
[52] U.S. Cl. ...................... 43/44.2; 43/44.83; 43/44.85; 43/44.87
[58] Field of Search ...................... 43/44.83, 44.2, 43/44.84, 44.85, 44.86, 44.87, 43.1, 42.74

[56] References Cited

U.S. PATENT DOCUMENTS

| | | | |
|---|---|---|---|
| 315,967 | 4/1885 | Spencer. | |
| 797,161 | 8/1905 | West. | |
| 1,461,246 | 7/1923 | Lent. | |
| 1,717,376 | 6/1929 | Ellerbroek. | |
| 2,553,895 | 5/1951 | Carter | 43/44.2 |
| 2,636,307 | 4/1953 | Mason et al. | 43/44.83 |
| 2,763,086 | 9/1956 | Johnson et al. | 43/44.2 |
| 2,860,443 | 11/1958 | Robinson | 43/44.4 |
| 2,880,545 | 4/1959 | Stadler | 43/4 |
| 2,900,754 | 8/1959 | Orlik | 43/44.2 |
| 3,050,896 | 8/1962 | Parker | 43/4 |
| 3,193,962 | 7/1965 | Simpson | 43/4 |
| 3,327,423 | 6/1967 | Kotis | 43/44.2 |
| 3,521,395 | 7/1970 | Klemkowski, Jr. | 43/44.6 |
| 3,736,691 | 6/1973 | Gist | 43/44.8 |
| 4,107,866 | 8/1978 | Manno | 43/44.83 |
| 4,688,347 | 8/1987 | Krogmann | 43/44.8 |

*Primary Examiner*—Jack W. Lavinder
*Attorney, Agent, or Firm*—Norman E. Lehrer

[57] ABSTRACT

A leader wire made from a more flexible 7×19 stainless steel cable rather than the standard 7×7 cable leader wire includes a loop at one end and a swivel at the other. A first hook is attached to the loop at the end of the leader. Intermediate the two ends is a second hook which is movable along the length of the leader. A length of thin copper wire is twisted around the leader at a position between the second hook and the swivel and is movable therealong. The copper wire can be held in place, however, by a small sleeve that passes over the same. The wire is utilized to hold the mouth of the bait fish closed and to hold the bait fish in place by wrapping the wire around the same.

8 Claims, 1 Drawing Sheet

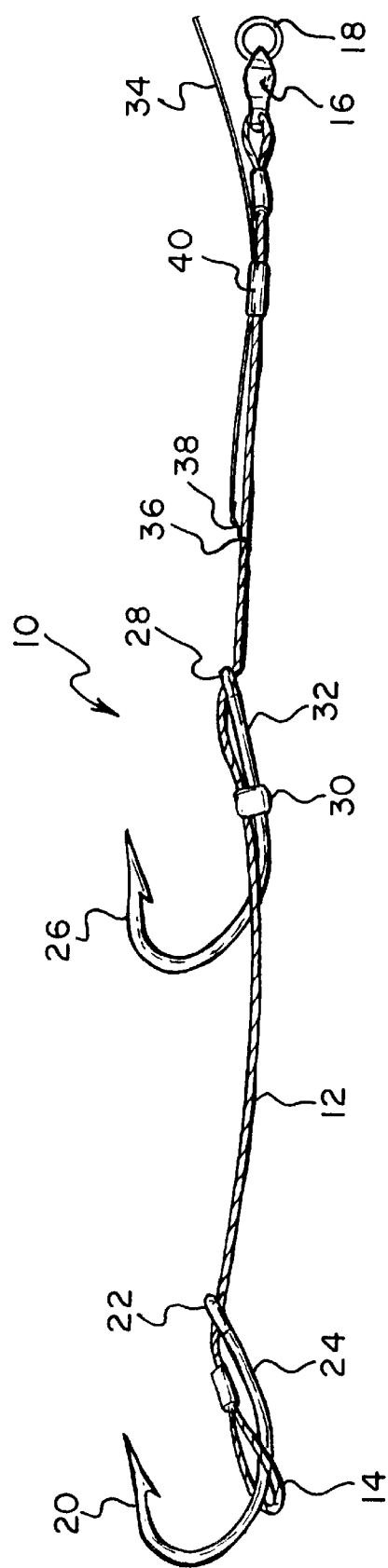

FISHING RIG

BACKGROUND OF THE INVENTION

The present invention is directed toward a fishing rig and, more particularly, to the type of fishing rig commonly referred to as dead bait tackle generally used for catching big game fish by trolling.

The double hook rigging of bait on a tackle line for catching game fish has been notoriously time consuming and frustrating for the fisherman. The bait which is normally in the form of a small dead fish must be attached in such a way as to impart life-like action to the fish and to retain the bait in a very natural position to simulate the bait as it would normally appear if it were swimming. Several devices have been proposed in the past that have attempted to accomplish this result but all have failed for one reason or another.

Because of the way that many of the prior art devices are attached to the dead fish, they tend to pull the same from the back or underside of the fish which causes the fish to curl when drawn in the water during a trolling operation. Other riggings that attempt to avoid this problem are frequently more complicated arrangements that can either be too costly or too time consuming to utilize.

Furthermore, even with riggings that have been created which do properly attach a bait fish to the same, the cable used in making the rigs is normally relatively rigid so as to give the same the proper strength. This rigidity of the cable, however, also prevents the bait from having a natural swimming appearance when trolling.

Such prior art fishing rigs are described, for example, in U.S. Pat. Nos. 3,193,962; 3,327,423; 3,736,691; 4,688,347 and 5,218,780. To Applicant's knowledge, however, none of these prior art devices has ever been satisfactory as they all possess one or more of the deficiencies described above.

SUMMARY OF THE INVENTION

It is, therefore, an object of the present invention to overcome the deficiencies of the prior art described above by providing a fishing rig which is used to support a dead fish in such a way that the same appears to be life-like when trolling.

It is a further object of the present invention to provide a fishing rig which is inexpensive to produce.

It is a still further object of the present invention to provide a fishing rig which is relatively easy to utilize.

It is an even still further object of the present invention to provide a fishing rig which can be used to properly support bait fish of varying sizes.

It is an additional object of the present invention to provide a fishing rig which utilizes two hooks of any size and style that the angler chooses and which can be adjusted to rig baits of varying sizes and is completely hidden inside the bait when rigged.

These and other objects and advantages to be described below are accomplished in accordance with the present invention by first producing the leader wire from a more flexible 7×19 stainless steel cable rather than the standard 7×7 cable whereby the more flexible cable allows for more natural swimming bait. The leader wire includes a loop at one end and a swivel at the other. Intermediate the two is a hook which is movable along the length of the leader. A second hook is attachable to the loop at the end of the leader. A length of thin copper wire is twisted around the leader at a position between the first hook and the swivel joint and is movable therealong. The copper wire can be held in place, however, by a small sleeve that passes over the same. The wire is utilized to hold the mouth of the bait fish closed and to hold the bait fish in place by wrapping the wire around the same.

BRIEF DESCRIPTION OF THE DRAWING

For the purpose of illustrating the invention, there is shown in the accompanying drawing a form which is presently preferred; it being understood that the invention is not intended to be limited to the precise arrangements and instrumentalities shown.

The sole FIGURE is a side elevational view of a fishing rig or tackle in accordance with the present invention.

DETAILED DESCRIPTION OF THE PREFERRED EMBODIMENT

Referring now to the drawing in detail, there is shown in the sole FIGURE a side elevational view of a fishing rig constructed in accordance with the principles of the present invention and designated generally as 10. The rig 10 is comprised essentially of a leader 12 having a loop 14 formed at the distal end thereof (the left side as viewed in the FIGURE) and a conventional swivel 16 connected to the proximal end thereof (the right side as viewed in the FIGURE). A ring 18 is attached to the swivel 16 for connection to a fishing line in a known manner.

The length of the leader 12 may be chosen as desired depending on the size of the bait fish to be carried thereby. It has been found, however, that a length of between approximately 8 to 14 inches should satisfy substantially all needs. As will be seen, the means for attaching the bait fish to the rig are adjustable so that, if desired, a longer leader can be utilized to hold even relatively small bait fish.

Heretofore, leaders such as leader 12 have been produced from what is conventionally referred to as 7×7 cable. This means that there are seven strands making up the cable with each strand being comprised of seven wires. This conventional leader cable, however, has been found to be relatively rigid so that a dead bait fish carried thereon would also appear to be somewhat rigid and would not appear life-like when trolling. Accordingly, in the preferred embodiment of the invention, Applicant utilizes a 7×19 cable which has seven strands with nineteen wires per strand. Since the overall diameter of the 7×19 cable is essentially the same as the 7×7 cable, each of the nineteen wire strands of the 7×19 cable is substantially smaller than the individual wire strands of the 7×7 cable. As a result, the cable and, therefore, the leader 12 is much more flexible. Thus, a dead bait fish secured to the present rig has a more natural swimming appearance, i.e. it will appear to be alive to the game fish attempting to be caught. To Applicant's knowledge, no fishing rigs previously produced have ever utilized a 7×19 cable.

Referring again to the drawing, it can be seen that a first hook 20 is secured to the distal end of the leader 12. This is accomplished by passing the loop 14 through the eye 22 in the hook 20 and then around the barbed end of the hook so that the loop 14 surrounds the shank portion 24 of the first hook 20.

A second hook 26 is secured to the leader 12 intermediate the two ends thereof. This is accomplished by passing the loop 14 through the eye 28 of the second hook 26. After the hook 26 is properly arranged at its desired position along the length of the leader 12, a small elastic band or ring 30 which had previously been arranged on the leader 12 is forced over the eye 28 onto the shaft 32 of the hook 26 as shown in the FIGURE. In this position, the band or ring 30 relatively tightly grips the shank 32, forcing it against the leader 12 and holding the same in place against movement along the length of the leader 12.

Located forward of the second hook 26 is an elongated metallic wire 34. Wire 34 will eventually be used by wrapping the same around the mouth of the bait fish to keep it closed and to maintain the same in position. As is known in the art, it is desirable to keep the mouth of a bait fish closed when trolling so as to avoid water from entering therein which will create jerky, nonlife-like motions. Accordingly, the wire 34 is preferably from about 6 to 10 inches long although a wire somewhat smaller or somewhat larger may be utilized depending on the size of the bait fish.

The wire 34 is secured to the leader 12 by passing the same around the leader 12 so as to form a loop as shown at 36. The end of the wire 34 is then twisted around itself as shown at 38. The loop 36 is slightly larger than the diameter of the leader 12 so that the loop and, therefore, the wire 34 can be moved into any desired position along the length of the leader 12.

Also provided is a metal sleeve 40. Sleeve 40 is positioned around the leader 12 and the wire 34 and has an inner diameter which is just slightly larger than the combined thickness of the leader 12 and the wire 34. As a result, the sleeve 40 can be moved along the leader 12 and the wire 34. However, because the end of the wire 34 is twisted about itself as shown at 38, the diameter is slightly larger at that point. As a result, the sleeve 40 must be forced over this portion of the wire 34 where it frictionally grips the same. Thus, after the loop 36 of the wire 34 is placed in its desired position, it can be held at that position by forcing the sleeve 40 over the twisted end 38.

The fishing rig 10 described above is utilized in the following manner. First, an elongated needle is passed through the bait fish from the rear thereof to the gills. The loop 14 at the distal end of the leader is then attached to the needle and is pulled out thereby drawing the leader through the fish. At the time that the loop 14 is attached to the needle and pulled through the fish, hook 20 is not attached thereto. However, after the leader 12 is pulled through the fish and the loop 14 extends from the rear of the same, the hook 20 is attached by passing the loop 14 through the eye 22 in the hook and then around the tip of the hook and the shank portion 24 as explained above. The leader 12 is then pulled forwardly so that the hook 20 moves closer to the rear end of the fish.

The second hook 26 and elastic band or ring 30 are previously arranged on the leader 12 as indicated. The second hook 26 can be positioned at any point on the leader 12 by simultaneously pulling the leader 12 while holding the second hook 26. The second hook 26 is positioned within the bait fish and the leader 12 is then pulled forwardly so that the hook 20 engages the rear end of the fish. In this way, both of the hooks are essentially hidden by the bait fish.

After the hooks 20 and 26 are in place, the loop 36 of the wire 34 is slid rearwardly toward the mouth of the bait fish. At this point, the sleeve 40 is forced over the twisted wire section 38 so as to secure the wire 34 in place adjacent the mouth of the fish. Thereafter, the wire 34 is wrapped around the mouth of the fish to maintain the same in a closed condition.

The present invention may be embodied in other specific forms without departing from the spirit or essential attributes thereof and accordingly reference should be made to the appended claims rather than to the foregoing specification as indicating the scope of the invention.

I claim:

1. A fishing rig comprising:

a leader having a first end and a second end;

a loop formed at the first end of said leader;

a swivel attached to the second end of said leader;

a first hook having a shaft with a barb at one end and an eye at the other, said leader extending through said eye and said loop extending around said shaft of said first hook;

a second hook having a shaft with a barb at one end and an eye at the other, said second hook being attached to said leader intermediate said first and second ends thereof, said leader passing through said eye of said second hook whereby said second hook is selectively movable along the length of said leader;

means for preventing movement of said second hook relative to said leader;

an elongated wire member secured to said leader between said second hook and said swivel and being selectively movable along at least a portion of the length of said leader, and means for preventing movement of said wire member relative to said leader.

2. The fishing rig as claimed in claim 1 wherein said means for preventing movement of said second hook includes a ring member adapted to encompass said leader and said shaft of said second hook.

3. The fishing rig as claimed in claim 2 wherein said ring member is comprised of an elastic material.

4. The fishing rig as claimed in claim 1 wherein said means for preventing movement of said wire member includes a rigid sleeve passing around said leader and said wire member.

5. The fishing rig as claimed in claim 4 wherein said wire member is attached to said leader through an end thereof which passes around the circumference of said leader and is then twisted about itself to form a twisted portion.

6. The fishing rig as claimed in claim 5 wherein said rigid sleeve member can be force fitted around said twisted portion of said wire member to secure the same in place.

7. The fishing rig as claimed in claim 1 wherein said leader is comprised of a metal cable.

8. The fishing rig as claimed in claim 7 wherein said cable is comprised of seven metal strands wherein each strand is comprised of nineteen thin elongated wires.

* * * * *